US007339941B2

(12) United States Patent
Twomey (10) Patent No.: US 7,339,941 B2
(45) Date of Patent: Mar. 4, 2008

(54) CONNECTING ETHERNET BASED SYSTEM ON A CHIP INTEGRATED CIRCUITS IN A RING TOPOLOGY

(75) Inventor: John Twomey, Bedford, MA (US)

(73) Assignee: Broadcom Corporation, Irvine, CA (US)

( * ) Notice: Subject to any disclaimer, the term of this patent is extended or adjusted under 35 U.S.C. 154(b) by 806 days.

(21) Appl. No.: 10/778,696

(22) Filed: Feb. 13, 2004

(65) Prior Publication Data

US 2005/0180437 A1  Aug. 18, 2005

(51) Int. Cl.
*H04L 12/28* (2006.01)
(52) U.S. Cl. .................................................. 370/401
(58) Field of Classification Search ................ 370/401, 370/389, 400, 352, 392, 390, 398, 395.5, 370/463, 465, 468, 475, 351, 466, 412, 230, 370/399
See application file for complete search history.

(56) References Cited

U.S. PATENT DOCUMENTS 7,035,255 B2 * 4/2006 Tzeng ........................ 370/389

* cited by examiner

*Primary Examiner*—Chi Pham
*Assistant Examiner*—Alexander O. Boakye
(74) *Attorney, Agent, or Firm*—Garlick Harrison & Markison; Bruce E. Garlick (57) ABSTRACT

A plurality of System On a Chip (SOC) integrated circuits, a media that intercouples the plurality of SOC integrated circuits to form at least one SOC LAN ring, and a routing address scheme. Each SOC integrated circuit includes at least one processor, a system bus, a memory controller, at least two Local Area Network (LAN) ports, and a receive channel selection block. The media intercouples the LAN ports of the plurality of SOC integrated circuits to form at least one SOC LAN ring. The routing address scheme serves in routing of data packets on the at least one SOC LAN ring. A routing address of the routing address scheme has a first portion that identifies a source SOC integrated circuit, a second portion that identifies a destination SOC integrated circuit, and a third portion that comprises a LAN address and data.

23 Claims, 8 Drawing Sheets

CONNECTING ETHERNET BASED SYSTEM ON A CHIP INTEGRATED CIRCUITS IN A RING TOPOLOGY

BACKGROUND

1. Technical Field

The present invention relates generally to data communications and more particularly to sharing data among a plurality of processing resources.

2. Related Art

Communication technologies that link electronic devices are many and varied, servicing communications via both physical media and wirelessly. Some communication technologies interface a pair of devices, other communication technologies interface small groups of devices, and still other communication technologies interface large groups of devices. Examples of transaction based wired communication technologies include the PCI (peripheral component interface) standard, the ISA (industry standard architecture) standard, the USB (universal serial bus) standard, and the HyperTransport (HT) standard, previously known as the Lightning Data Transport (LDT). Examples of data packetized wired communication standards include the Ethernet standard and the SPI (system data packet interface) standard, among others. Examples of wireless Local Area Networking (LAN) standards include the IEEE 802.11x standards, the Bluetooth standard, the IEEE 802.15 standard, for example. Other wireless standards include various cellular standards, various satellite standards, and others.

Data packet data routers, server computers, data storage devices, and other data processing devices often include a plurality of distinct processing resources. Each of these distinct processing resources include one or more processing resources, memory resources, and a communication interface. These distinct processing resources may reside on respective Printed Circuit Boards (PCBs). Alternately, sets of distinct processing devices may share a PCB. The PCBs may removably mount within a housing and communicatively couple via back plane connectors or other connecting media. Use of groups of distinct processing resources increase the processing capabilities of the device and allow the device to function should one or more of these distinct processing resources fail.

Interconnecting the distinct processing resources is problematic. Because the distinct processing resources couple via a back plane connector or another connecting media, a high speed transaction interface, e.g., HT, PCI, etc., cannot typically be used. Thus, a data packetized interface, e.g., Ethernet or SPI, must typically be employed. The data packetized resource employs an addressing scheme that adds complexity to the operation of the device. Further, a relatively complex communication interface is required for each distinct processing resource. This combination of requirements increases the cost of each distinct processing resource, increases the power consumed by each distinct processing resource, increases the heat produced by each processing resource, and slows the operation of each processing resource. Thus, a need exists to overcome at least these problems of the prior devices.

BRIEF SUMMARY OF THE INVENTION

An interconnected processing system constructed according to the present invention solves the above-described shortcomings, among others, and includes a plurality of System On a Chip (SOC) integrated circuits, a media that intercouples the plurality of SOC integrated circuits to form at least one SOC LAN ring, and a routing address scheme. Each of the SOC integrated circuits includes at least one processor, a system bus operably coupled to the at least one processor, a memory controller operably coupled to the system bus, at least two Local Area Network (LAN) ports coupled to the system bus, and a receive channel selection block that maintains routing information for the at least two LAN ports. The media intercouples the LAN ports of the plurality of SOC integrated circuits to form at least one SOC LAN ring. The routing address scheme used by the LAN ports of the plurality of SOC integrated circuits serves in the routing of data packets on the at least one SOC LAN ring. A routing address of the routing address scheme has a first portion that identifies a source SOC integrated circuit, a second portion that identifies a destination SOC integrated circuit, and a third portion that comprises a LAN address and data.

At least one of the SOC integrated circuits includes at least three LAN ports, two of which form a portion of the at least one SOC LAN ring and a third of which couples to an external LAN. The plurality of SOC integrated circuits may reside upon separate circuit boards. Alternately, at least two of the plurality of SOC integrated circuits may reside upon a common circuit board. Each of the plurality of SOC integrated circuits intercouples to two neighboring SOC integrated circuits via the at least one SOC LAN ring. Thus, the SOC LAN ring may include both a first SOC LAN ring and a second SOC LAN ring. In some constructs, LAN traffic routes in one direction on the first SOC LAN ring and in a differing direction on the second SOC LAN ring.

The interconnected processing system may operate such that LAN traffic is rerouted to a differing SOC LAN ring when a break occurs in a corresponding SOC LAN ring. In such case, the routing address scheme may further include a reverse routing indicator portion to indicate whether routing of a corresponding data packet has been reversed. The reverse routing indicator portion may be employed to determine whether to remove the data packet from the at least one SOC LAN ring when routing has failed.

Other features and advantages of the present invention will become apparent from the following detailed description of the invention made with reference to the accompanying drawings.

DETAILED DESCRIPTION OF THE DRAWINGS

Figure 1:
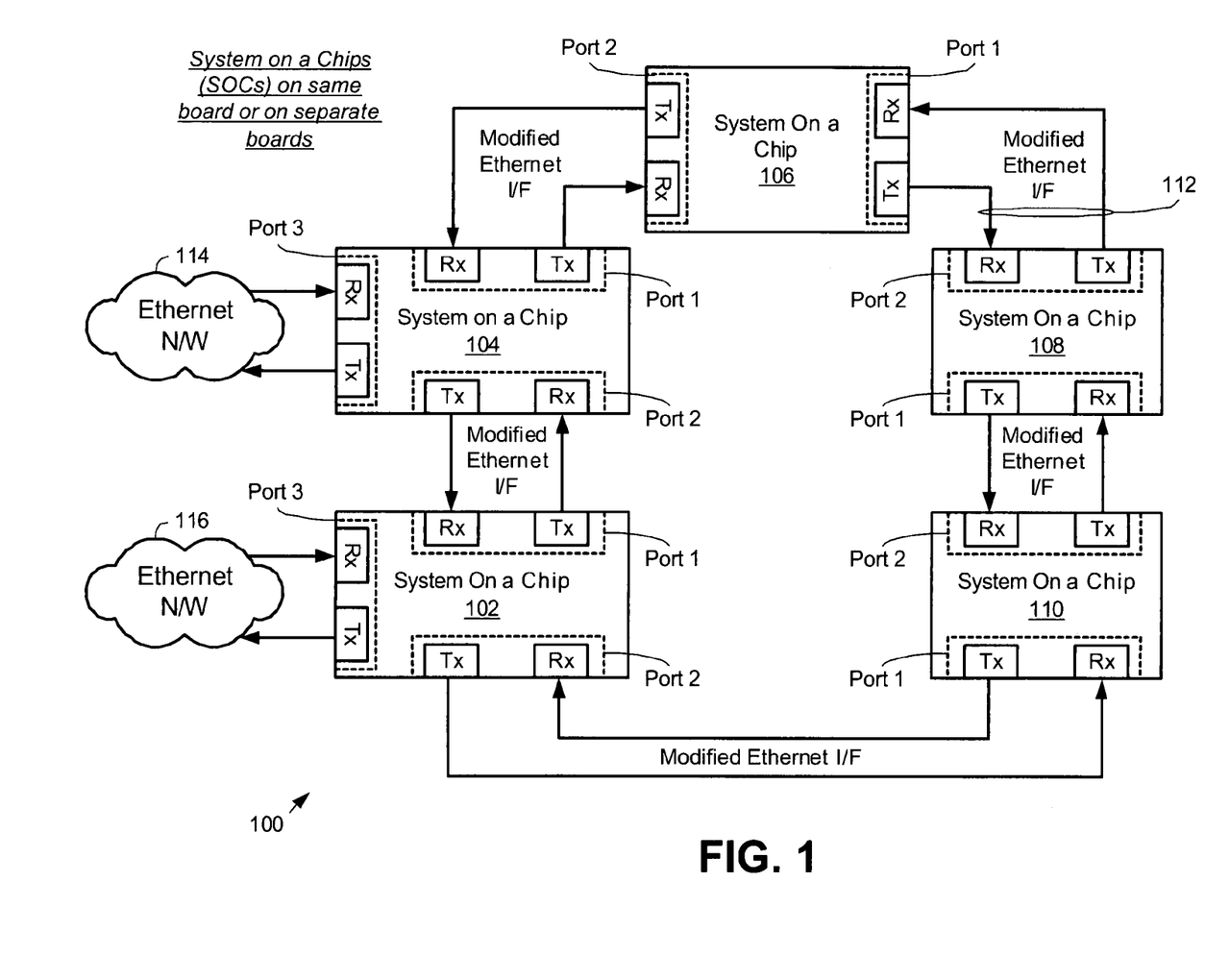
FIG. 1 is a block diagram illustrating an interconnected processing system constructed according to one embodiment of the present invention.

FIG. 1 is a block diagram illustrating an interconnected processing system constructed according to one embodiment of the present invention. As shown in FIG. 1, the interconnected processing system 100 includes a plurality of System On a Chip (SOC) integrated circuits 102, 104, 106, 108, and 110. As will be described further with reference to FIG. 4, each of these SOC integrated circuits includes at least one processor, a system bus operably coupled to the at least one processor, a memory controller operably coupled to the system bus, at least two local area network (LAN) ports coupled to the system bus, and a receive channel selection block that maintains routing information for the at least two LAN ports.

A media 112 intercouples the LAN ports of the plurality of SOC integrated circuits 102-110 to form an SOC LAN having at least one SOC LAN ring. As shown in FIG. 1, the media 112 includes two media portions one of which services a first set of receive (Rx) LAN ports and transmit (Tx) LAN ports and a second one that services a differing set of Rx LAN ports/Tx LAN ports. As will be further described with reference to FIGS. 2-8, the SOC integrated circuits 102-110 employ a routing address scheme that services routing of data packets on the at least one SOC LAN ring. The routing address scheme includes a source SOC integrated circuit ID, a destination SOC integrated circuit ID, and a LAN address. The LAN address corresponds to the Ethernet standard or another LAN standard.

At least some of the SOC integrated circuits 102-110 include more than two LAN ports. SOC integrated circuits 102 and 104, for example, may couple to external LANs 116 and 114, respectively. Data packets route into the SOC LAN rings from the external LANs 114 and 116, route within the SOC LAN rings, and route to the LANs 114 and/or 116 from the SOC LAN rings.

Figure 2:
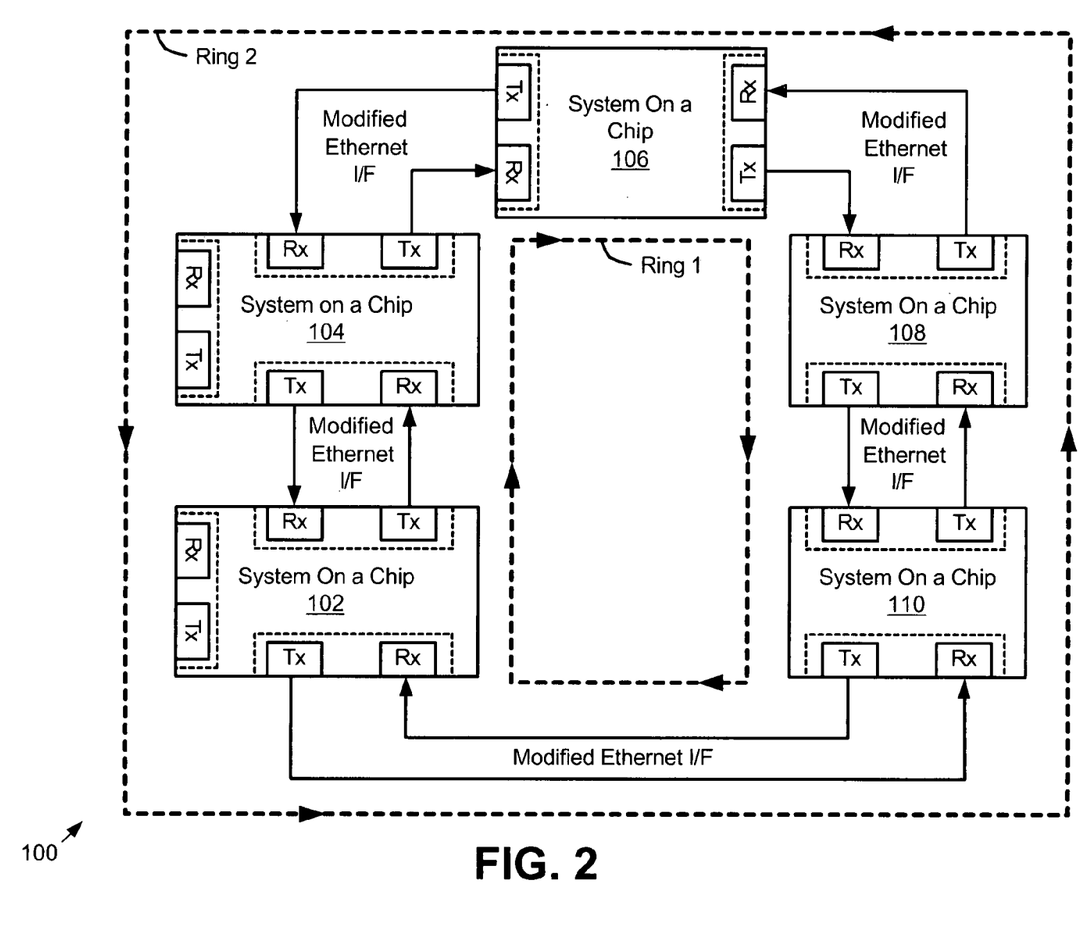
FIG. 2 is a block diagram illustrating a portion of the interconnected processing system of FIG. 1 during normal operations.

FIG. 2 is a block diagram illustrating a portion of the interconnected processing system of FIG. 1 during normal operations. As is shown in FIG. 2, the interconnected processing system and the media form two separate SOC LAN rings. A first LAN ring referred to as ring 1 in FIG. 2 includes Rx and Tx ports of differing LAN ports for each of the SOC integrated circuits 102-110. The dotted ring surrounding the interconnected processing system 100 shows the direction of data packet flow in ring 1. Further, the dotted line surrounding the plurality of SOC integrated circuits 102-110, referred to as ring 2, shows the direction of data packet flow on the ring 2. During normal operations, data packets will flow in a first direction on ring 1 and in an opposing direction on ring 2. Data packets flow in a corresponding SOC LAN ring based upon routing consideration such as routing length, a preferred routing ring for the source SOC, a preferred routing ring for the destination SOC, or other considerations that will assist the expeditious and efficient routing of data packets within the SOC LAN.

Figure 3:
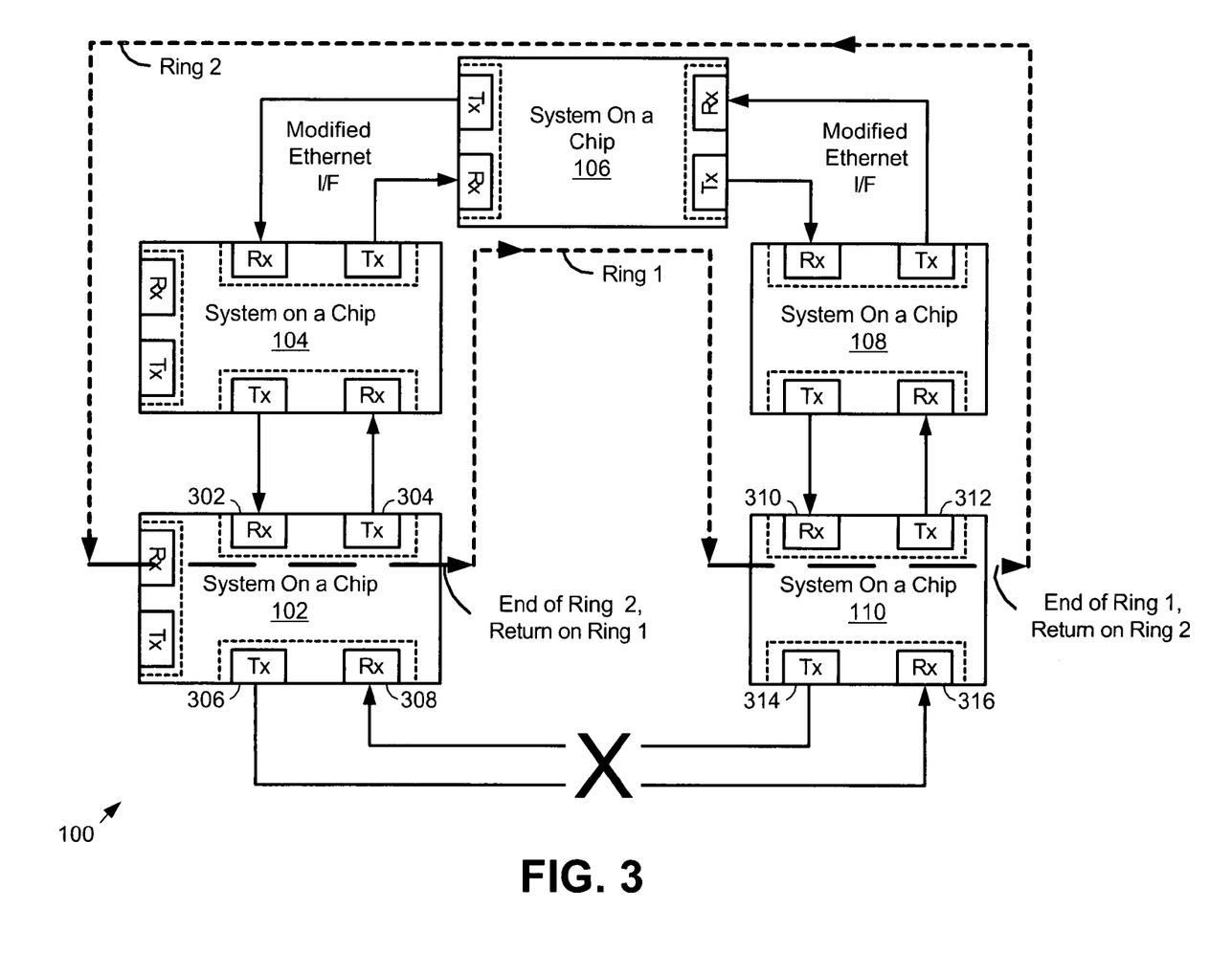
FIG. 3 is a block diagram illustrating the interconnected processing system of FIG. 1 during operation in which a portion of a servicing System On a Chip (SOC) Local Area Network (LAN) ring is broken.

FIG. 3 is a block diagram illustrating the interconnected processing system of FIG. 1 during operation in which a portion of a servicing System On a Chip (SOC) Local Area Network (LAN) ring is broken. During some operations of the interconnected processing system 100, coupling media will be non-functional, one or more LAN ports may be non-functional, a portion of the interconnected processing system 100 may be removed for maintenance, or another event will occur that causes a portion of one or both of the SOC LAN rings to become non-functional.

As illustrated in FIG. 3, when a media that otherwise couples SOC integrated circuit 102 to SOC integrated circuit 110 is non-functional, traffic may not be routed between SOC integrated circuits 102 and 110. Such disruption of the traffic flow disrupts completely the flow on both ring 1 and ring 2 of the SOC LAN rings at this portion of the SOC LAN rings. Thus, according to the present invention, data packets that would otherwise be continually or routing along one of the rings will be re-routed upon another of the rings in order to allow the data packets to reach their intended destination.

Data packet data traffic routing upon ring 2 from SOC integrated circuit 104 to SOC integrated circuit 102 enters Rx port 302 of SOC integrated circuit 102. In a normal operation, this data packet data traffic when not intended for SOC integrated circuit 102 would be routed out Tx port 306 of SOC integrated circuit 102. However, because the media coupling SOC integrated circuit 102 and SOC integrated circuit 110 is non functional, the traffic on ring 2 entering Rx Port 302 must be re-routed. In such case, this data packet data traffic entering on Rx port 302 when not intended for SOC integrated circuit 102 will be routed out Tx port 304 of SOC integrated circuit 102. Thus, the data packet data traffic incoming on ring 2 SOC integrated circuit 102 will be routed out of SOC integrated circuit 102 on ring 1 to SOC integrated circuit 104. According to one aspect of the present invention, this data packet data may be altered to indicate that it has been routed on a different ring by SOC integrated circuit 102. This information may be used later to remove the data packet from further routing when it has become clear that the destination of the data packet is not reachable via the currently servicing media.

Likewise, data packets received at Rx port 310 of SOC integrated circuit 110 that would be otherwise routed out on Tx port 314 must be re-routed. Such re-routing includes routing data packets not intended for SOC integrated circuit 110 and received on Rx port 310 out on Tx port 312. In such case, incoming data on ring 1 would be output on ring 2 of the SOC LAN rings via Tx port 312. These data packets may also be altered to indicate their rerouting on a differing SOC LAN ring.

Figure 4:
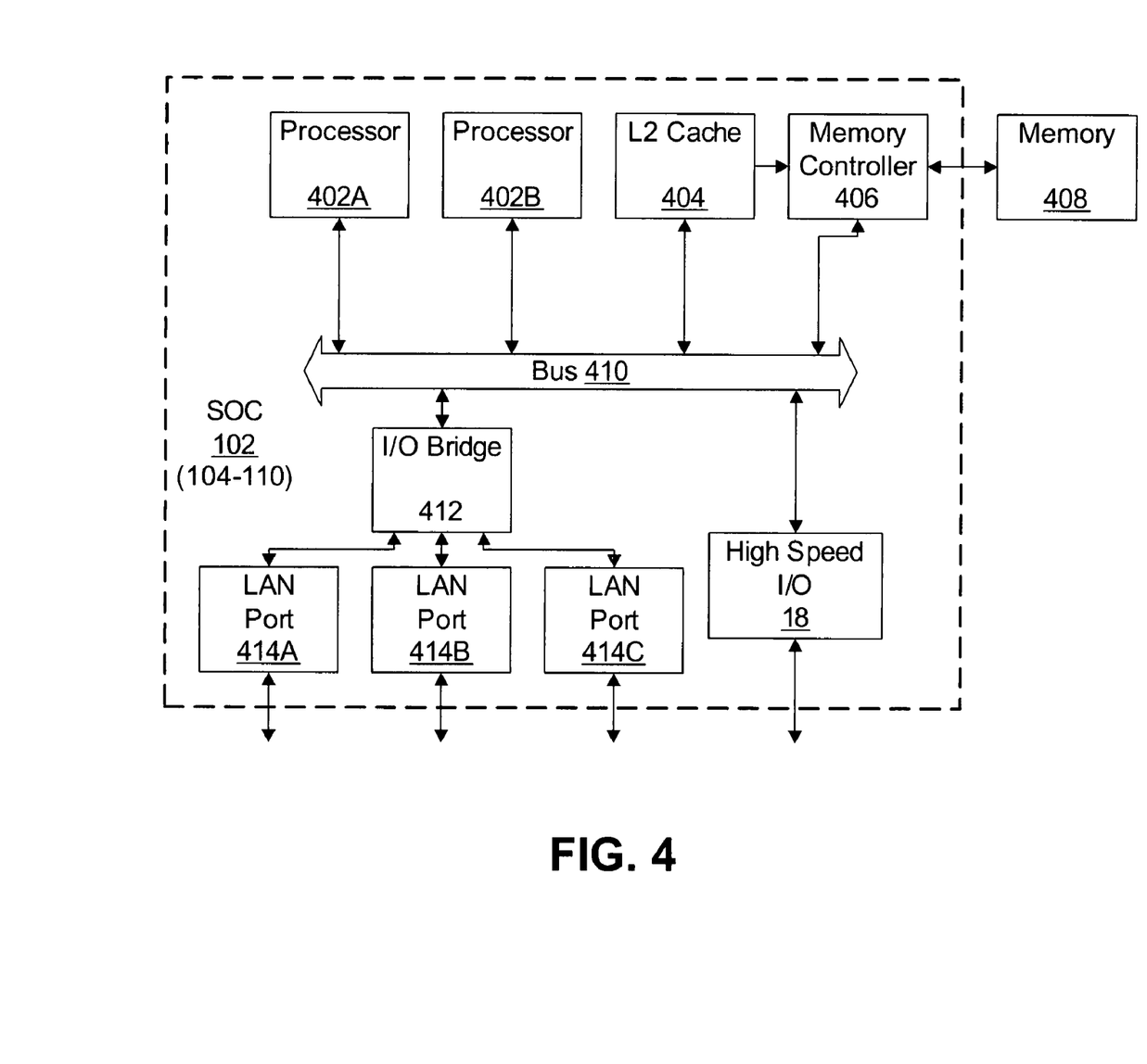
FIG. 4 is a block diagram illustrating a SOC integrated circuit constructed according to the present invention.

FIG. 4 is a block diagram illustrating a SOC integrated circuit constructed according to the present invention. As shown in FIG. 4, the SOC integrated circuit 102 includes processors 402A and 402B operably coupled to processor bus 410 or system bus 410. L2 Cache 404 Memory Controller 406 couple to system bus 410 to provide memory functionality for the SOC integrated circuit 102. External memory 408 couples to memory controller 406 to provide system memory for the SOC integrated circuit 102. I/O Bridge 412 couples to System Bus 410 and couples to LAN ports 414A, 414B, and 414C. In the embodiment of FIG. 4, the LAN ports 414A-414C support the Ethernet standard and support operations according to the present invention. High speed I/O 18 also couples to System Bus 410 to service high-speed I/O requirements. The high speed I/O Bus 18 may support the PCI standard, the HT standard, or another high speed I/O operating standard.

The LAN ports 414A through 414C support the SOC LAN rings of the present invention. As the reader will understand from FIGS. 1 through 4, two of the LAN ports 414A and 414B may support the two SOC LAN rings ring 1 and ring 2 of the present invention previously illustrated in FIGS. 2 and 3. Further, the third LAN port 414C may support connection to an external LAN, e.g. 114 or 116 of FIG. 1.

In general, one of the processors, e.g., 402A, in the SOC integrated circuit 102 is used to handle one or more of the LAN ports 414A-414C even though there is no set convention for this operation. Alternatively, these duties could be split among the processors with one processor handling one of the Tx and Rx channels within a LAN port and the other processors handling the other Tx and Rx channels within the same LAN port. The additional overhead of operations according to the present invention in forwarding data from the Rx port of one Ethernet port to the Tx port of another LAN port can therefore be handled by the existing processor, or by a spare processor, with minimal overhead.

Figure 5A:
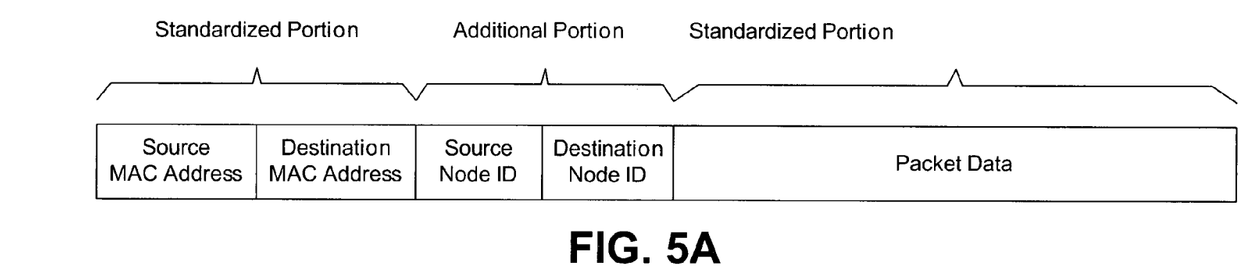
FIG. 5A is a block diagram illustrating a data packet constructed according to the present invention.

FIG. 5A is a block diagram illustrating a data packet constructed according to the present invention. The data packet invention includes a standardized portion and additional information according to the present invention. The standardized portion may include a Source MAC Address, a Destination MAC Address, and Data packet Data. The additional portion includes a Source Node ID and a Destination Node ID. The Source Node ID and Destination Node ID are used for routing Data packets within the SOC LAN of the present invention. The relative position of the standardized portions and additional portions may vary in other embodiments.

Figure 5B:
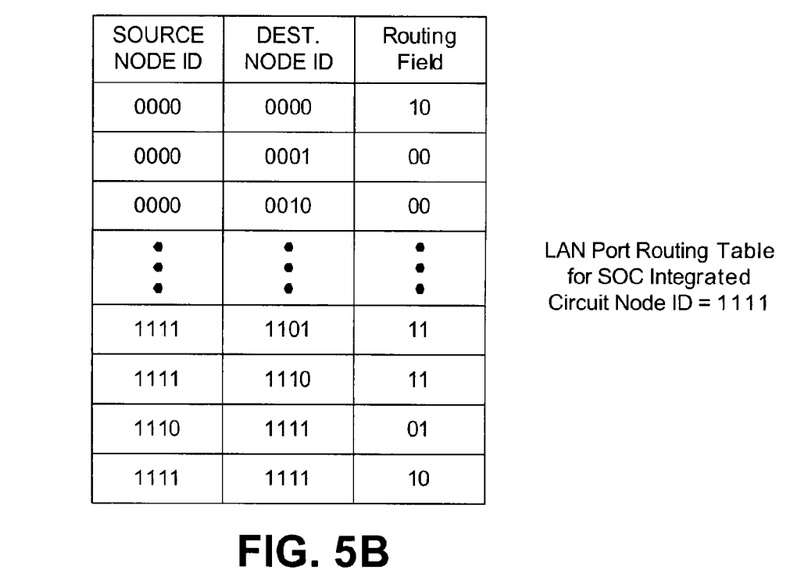
FIG. 5B is a block diagram illustrating a routing table structure used according to the present invention.

FIG. 5B is a block diagram illustrating a routing table structure used according to the present invention. Each LAN port of the SOC integrated circuit 102 through 110 includes one or more LAN port routing tables. In the embodiment of the LAN port routing table of FIG. 5B, an entry exists for each combination of Source Node ID and Destination Node ID such that the concatenated value of four bits of the Source Node ID and four bits of the Destination Node ID serves as an address into the 256 entry deep table. The Routing Field contained in the LAN port routing table provides information used to determine whether the data packet is to be routed internal to the SOC, to be routed out on the SOC LAN ring upon which the data packet was received, or whether exception processing is required. Each LAN port routing table is programmed by a responsible processor of the SOC integrated circuit.

As will be described further with reference to FIGS. 6-8, data packets are routed internal to the SOC integrated circuit, external to the SOC integrated circuit onto the same SOC LAN ring upon which the data packet was received, or external to the SOC integrated circuit on a differing SOC LAN ring. For the illustrated embodiment, during normal operations, a Routing Field value of 00 indicates that external routing on a common same SOC LAN ring is required (channel 0). Further, in the particular embodiment, a Routing Field value of 01 indicates that normal internal routing is required (channel 1). For a first exception case (abnormal operations) in which the Source Node ID=Destination Node ID, the Routing Field entry is 10. For a second exception case (abnormal operations) in which the Source Node ID=the Node ID of the servicing SOC integrated circuit, the Routing Field entry is 11. Both of these exception cases require intervention by a servicing processor. Depending upon the exception operations, the data packet may be routed to the servicing processor via channel 1. Alternately, exception case processing may cause the data packet to be routed onto a differing SOC LAN ring, e.g., out on the same LAN port as which the data packet was received.

In the particular example of FIG. 5B, the Node ID of the SOC integrated circuit is 1111. For first exception cases, all entries in the table in which the Source Node ID=1111 (except for where Source Node ID=1111=Destination Node ID) will have a Routing Field value of 11. For second exception cases, all entries having Source Node ID=Destination Node ID will have a Routing Field value of 10. For some non-exception cases, where neither the Source Node ID nor the Destination Node ID is equal to 1111, the Routing Field value is 00. For other non-exception cases, where the Destination Node is equal to 1111, the Routing Field value is 01.

Figure 6:
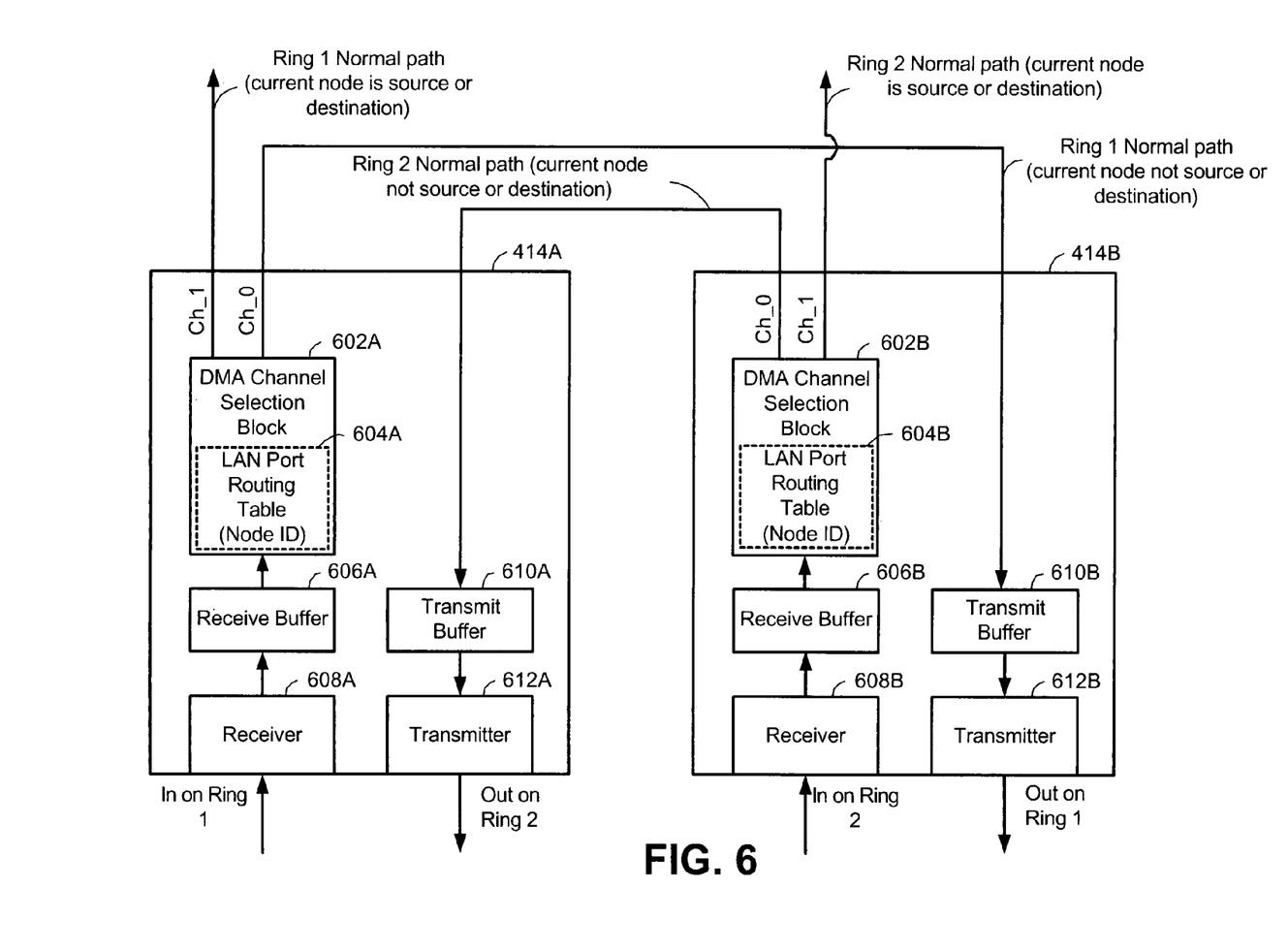
FIG. 6 is a block diagram illustrating a portion of an SOC integrated circuit during a normal SOC LAN ring operation.

FIG. 6 is a block diagram illustrating a portion of an SOC integrated circuit during a normal SOC LAN ring operation. Referring now to FIG. 6, a particular structure of LAN ports 414A and 414B is illustrated. LAN port 414A includes a DMA channel selection block 602A having LAN port routing table 604A, receiver 608A, receive buffer 606A, transmit buffer 610A and transmitter 612A. Likewise, LAN port 414B includes DMA channel selection block 602B, LAN port routing table 604B, receive buffer 606B, receiver 608B, transmit buffer 610B and transmitter 612B. In the particular embodiment of FIG. 6, receiver 608A and transmitter 612B service SOC LAN ring 1 while receiver 608B and transmitter 612A service SOC LAN ring 2.

Each DMA Channel Selection block 602A and 602B inspects the incoming data packets, e.g. looks 128 Bytes deep into the data packets, uses the Source Node ID and Destination Node ID to classify each data packet as being of one of four different types (based upon Routing Field values of the LAN port routing table), and makes a decision about which of two buffer descriptor rings onto which to place each received data packet. This feature can be exploited to offload the number of CPU cycles required to forward each data packet to its next destination. The DMA Channel Selection blocks 602A and 602B may also be used to decode TOS (Type of Service) fields in Ethernet (and FIFO) data packets, and chose DMA channels to receive the data packets, while marking a receive buffer descriptor with information of what type of data packet it is.

As was previously described with reference to FIG. 5B, the LAN port routing tables 604A and 604B may be addressed by 8 bits, made up of the concatenated combination of the Source Node ID and the Destination Node ID of the incoming data packet. Before data packet reception is commenced, a responsible processor will update 256 Routing Field entries in the table with a two-bit field of four possible values: 0, 1, 2 and 3. Each data packet received will have it's concatenated Source Node ID/Destination Node ID looked up in the LAN port routing table 604A/604B at wire speed, and the Routing Field value obtained will determine where the data packet is sent. All data packets having a corresponding Routing Field value of 0 will be routed via corresponding DMA channel 0 for that Ethernet Port. Any data packet with a non-zero Routing Field value (1, 2, or 3) will be routed to corresponding DMA channel 1 for that Ethernet Port. When the Routing Field value is 2 or 3, the processor will perform exception processing. Either processor 402A or 402B can be optionally interrupted to handle this event, or one of the processors can poll the channel count register, wait for a timeout interrupt, or wait until multiple data packets have been received before handling this event. The LAN port routing table 604A/604B may be updated by the servicing processor once a data packet is completely received.

When the data packet is not for the particular SOC integrated circuit (node), i.e., Routing Field=00, the processor copies the Rx Buffer descriptor to the Tx buffer ring for LAN port 414B, updates the Tx count register and the data packet is propagated down the ring. If a destination field does match the Node ID of a receiving node, i.e., Routing Field=01, the data packet is assigned to DMA Rx channel 1 and the buffer descriptor is marked with a type "1". For a Routing Field=10, i.e., Source Node ID=Destination Node ID, routing is external via DMA Rx channel 1. For a Routing Field=11, i.e., the Source Node ID matches the Node ID of the servicing device, and in that case, the data packet has made it completely around the ring without a destination being found. Software executed by a responsible processor decides what to do with these data packets, but they wouldn't likely be propagated on the ring.

Thus, for the normal operations of FIG. 6, incoming data packets at receiver 608A are buffered by Receive Buffer 606A and then are routed via DMA channel selection block 602A. For data packets having destination ID corresponding to the Node ID of the SOC integrated circuit, based upon entries and routing tables 604A, the DMA channel selection block 602A routes the data packet internal to the SOC integrated circuit via channel_1. When the incoming data packet received on ring 1 at receiver 608A via receive buffer 606A is not intended for the particular SOC integrated circuit via DMA channel selection block 602 will route the data packet to transmit buffer 610B of LAN port 414B via channel_0. The data packet then will be routed out transmitter 612B onto SOC LAN ring 1.

Likewise, data packets incoming on ring 2 at receiver 608B are buffered at receive buffer 606B and then routed by DMA channel selection block 602B. Based upon the contents of routing table 604B, the DMA selection block 602B will route the data packet internal to the SOC integrated circuit via channel_1 when the destination ID of the data packet corresponds to the Node ID of the SOC integrated circuit. When the destination ID of the data packet does not correspond to the SOC integrated circuit, the DMA channel selection block 602B will route the data packet to transmit buffer 610A via channel_0 and the data packet will be routed out transmitter 612A onto ring 2.

Several enhancements to these operations are achievable with the number of nodes is reduced from 16. With 15 nodes, a broadcast field, say 0 b1111, could be used and every node other than the source node would receive and forward this data packet (would require the two exception cases above to be combined into one "type" so that the Receive DMA Channel Selection block could distinguish this special case).

If the number of nodes in any SOC LAN ring is limited to 8, the most significant bit (msb) of the Source Node ID field may be used to forward traffic in cases where a servicing SOC LAN ring is broken due to a SOC integrated circuit being down, or being removed/added. In this topology, data packets are forwarded until a SOC integrated circuit forming a portion of the SOC LAN ring doesn't have a functioning LAN port to forward the data packet to due to a missing adjacent SOC integrated circuit or broken Tx port, for example. Here, the processor responsible for the LAN port will invert the msb of the Source Node ID field and send the data packet on the Tx channel of the Ethernet Port it received the data packet on, thus sending it counter clockwise onto a differing SOC LAN ring, e.g., received data packet on a first SOC LAN ring and forwards the data packet onto a second SOC LAN ring. This operation will be described further with reference to FIG. 7. This way, the data packet will pass the source node once and then be rerouted onto a differing SOC LAN ring. If the data packet is destined for a node that is missing/non-functioning, the data packet will be turned around again on the far side of the SOC LAN ring again, the msb of the Source Node ID field will be inverted, and then the data packet will pulled off the SOC LAN ring by the source node the second time it is received.

Figure 7:
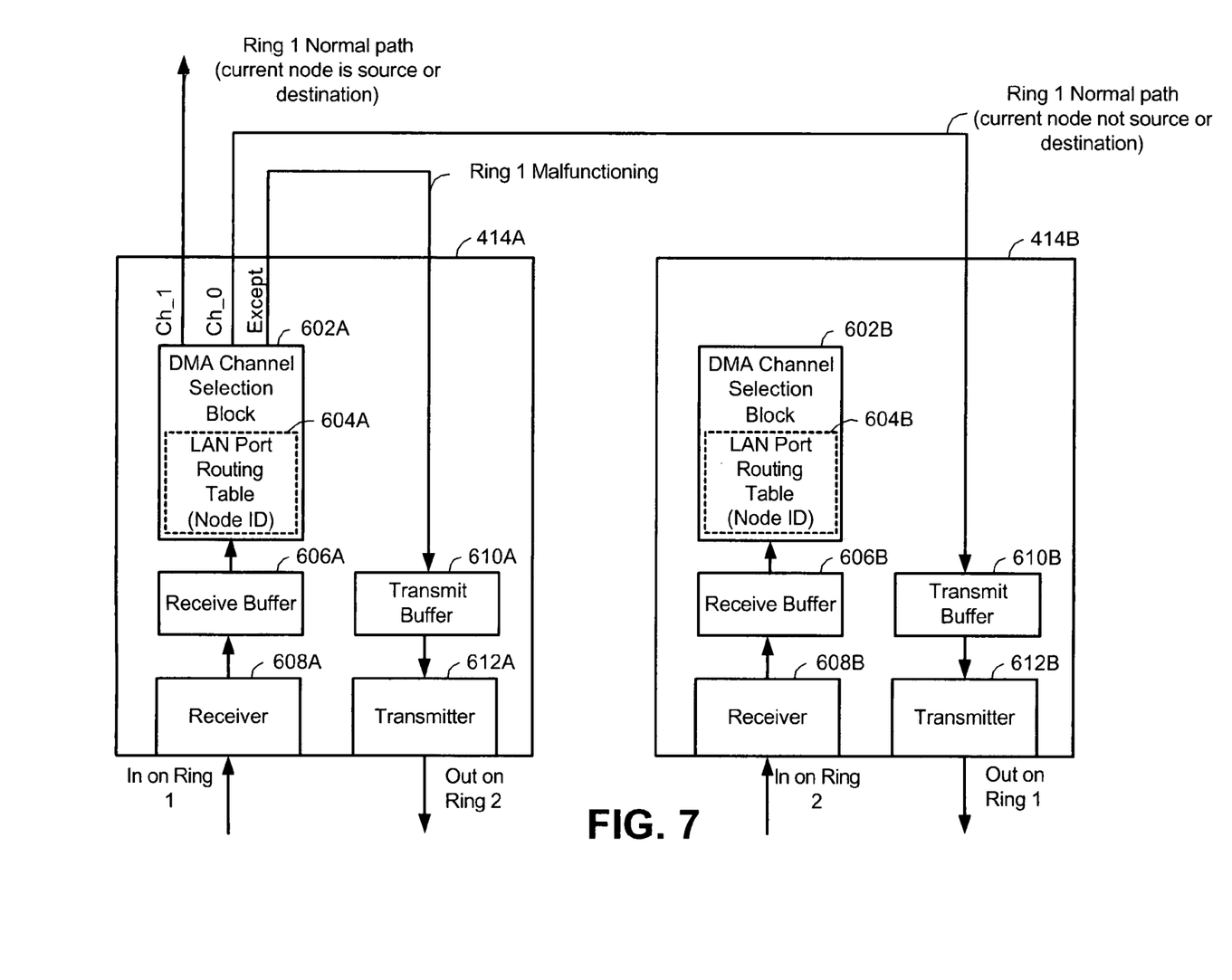
FIG. 7 is a block diagram illustrating the portion of FIG. 6 during abnormal SOC LAN ring operations.

FIG. 7 is a block diagram illustrating the portion of FIG. 6 during abnormal SOC LAN ring operations. In the example of FIG. 7, a data packet is received on ring 1 at receiver 608A of LAN port 414A. The data packet is buffered by buffer 606A and processed by DMA channel selection block 602A. When the data packet is intended for the SOC integrated circuit, the DMA channel selection block 602A routes the data packet internal to SOC integrated circuit for the processing via channel_1. During normal operations, when the data packet is not intended for the SOC integrated circuit the data packet is routed via channel_0 to transmit buffer 610B. Due to a problem in the SOC LAN ring at either Tx port 612B or at a coupled device, a responsible processor routes the data packet via transmit buffer 610A and transmitter 612A of LAN port 414A to ring 2 of the SOC LAN ring via channel_1.

Figure 8:
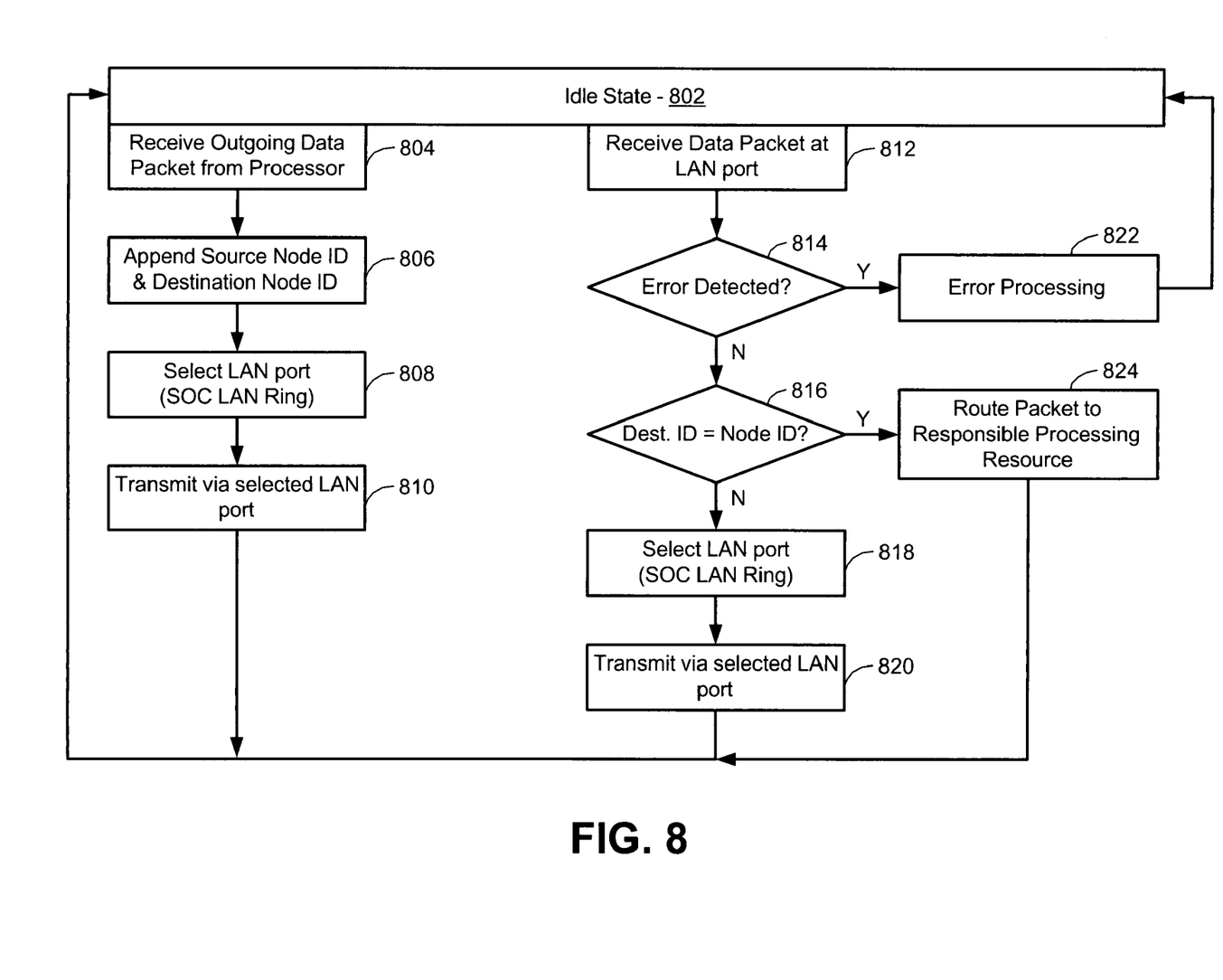
FIG. 8 is a flow chart illustrating the operation of an SOC integrated circuit according to the present invention.

FIG. 8 is a flow chart illustrating the operation of an SOC integrated circuit according to the present invention. Operation commences in FIG. 8 wherein the SOC integrated circuit is in an idle state (Step 802). In one particular operation, the SOC integrated circuit prepares an outgoing data packet for transmission (Step 804). The SOC integrated circuit, determining that the data packet is intended for another SOC integrated circuit of the interconnected processing system, appends a source node ID and a destination node ID to the data packet (Step 806). The SOC integrated circuit then selects a LAN port to use for transmission of the data packet (Step 808). Each of the SOC integrated circuits has a particular preference for routing data packets on one or more particular SOC LAN rings from multiple available SOC LAN rings. Such a selection may be based upon the destination node ID or simply the particular current loading on each of the SOC LAN rings of the interconnected processing system. The data packet is then transmitted on a selected LAN port onto a desired SOC LAN ring (Step 810). From Step 810, operation returns to the idle state of Step 802.

Upon receipt of a data packet at a LAN port (Step 812), the SOC integrated circuit determines whether the data packet is either formed in error or whether the data packet has failed to reach its destination and been returned (Step 814). Such error detection operations first consider whether the source node ID and the destination node ID are the same. Another error condition results when a data packet has circulated throughout the interconnected processing system without being received by an intended destination SOC integrated circuit. This error condition may occur when the source node ID corresponds to the now receiving SOC integrated circuit. When such error(s) occur, as determined at Step 814, operation proceeds to the error processing of Step 822 and then returns to the idle state at Step 802.

When no error is detected by the receiving SOC integrated circuit, the SOC integrated circuit determines whether the destination ID of the data packet corresponds to the node ID of the SOC integrated circuit (Step 816). When such is the case, the SOC integrated circuit routes the data packet to a responsible processing resource within the SOC integrated circuit (Step 824). From Step 824, operation returns to Step 802. When the destination ID of the data packet does not match the node ID of the SOC integrated circuit, the LAN port selects a LAN port for transmitting the data packet from the SOC integrated circuit onto a SOC LAN ring (Step 818). The LAN port then transmits the data packet via the selected LAN port (Step 820). From Step 820, operation proceeds to Step 802.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. An interconnected processing system comprising:
   a plurality of System On a Chip (SOC) integrated circuits, each comprising:
      at least one processor;
      a system bus coupled to the at least one processor;
      a memory controller coupled to the system bus;
      at least two Local Area Network (LAN) ports coupled to the system bus; and
      a receive channel selection block that maintains routing information for the at least two LAN ports;
   a media that intercouples LAN ports of the plurality of SOC integrated circuits to form at least one SOC LAN ring; and
   a routing address scheme used by the LAN ports of the plurality of SOC integrated circuits to route data packets on the at least one SOC LAN ring, a routing address of the routing address scheme having a first portion that identifies a source SOC integrated circuit, a second portion that identifies a destination SOC integrated circuit, and a third portion that comprises a LAN address and data.

2. The interconnected processing system of claim 1, wherein at least one of the SOC integrated circuits comprises at least three LAN ports, two of which form a portion of the at least one SOC LAN ring and a third of which couples to an external LAN.

3. The interconnected processing system of claim 1, wherein the plurality of SOC integrated circuits reside upon separate circuit boards.

4. The interconnected processing system of claim 1, wherein at least two of the plurality of SOC integrated circuits reside upon a common circuit board.

5. The interconnected processing system of claim 1, wherein each of the plurality of SOC integrated circuits intercouples to two neighboring SOC integrated circuits via the at least one SOC LAN ring.

6. The interconnected processing system of claim 1, wherein the at least one SOC LAN ring comprises a first SOC LAN ring and a second SOC LAN ring.

7. The interconnected processing system of claim 6, wherein LAN traffic is routed in one direction on the first SOC LAN ring and in a differing direction on the second SOC LAN ring.

8. The interconnected processing system of claim 7, wherein LAN traffic is rerouted to a differing SOC LAN ring when a break occurs in a corresponding SOC LAN ring.

9. The interconnected processing system of claim 1, wherein the routing address scheme further comprises a reverse routing indicator portion to indicate whether routing of a corresponding data packet has been reversed.

10. The interconnected processing system of claim 9, wherein one of the SOC integrated circuits employs the reverse routing indicator portion to determine whether to remove the data packet from the at least one SOC LAN ring when routing has failed.

11. An interconnected processing system comprising:
    a plurality of System On a Chip (SOC) integrated circuits, each comprising at least one processing resource, at least one memory resource, a system bus, a plurality of network interfaces, and a network interface routing table;
    a plurality of interconnections among the plurality of SOC integrated circuits;
    wherein the plurality of interconnections and the plurality of SOC integrated circuits form at least one SOC Local Area Network (LAN) ring;
    wherein each of the plurality of SOC integrated circuits is operable to be assigned a node ID within the at least one SOC LAN ring; and
    a routing address scheme used by the network interfaces of the plurality of SOC integrated circuits to route data packets on the at least one SOC LAN ring, a routing address of the routing address scheme having a first portion that identifies a source SOC integrated circuit, a second portion that identifies a destination SOC integrated circuit, and a third portion that comprises a LAN address and data.

12. The interconnected processing system of claim 11, wherein each of the plurality of network interfaces supports at least one version of the Ethernet standard.

13. The interconnected processing system of claim 11, wherein:
    each of the plurality of SOC integrated circuits includes at least two network interfaces; and
    the at least one SOC LAN ring comprises two communication rings.

14. The interconnected processing system of claim 11, wherein routing addresses used for routing SOC LAN traffic comprise:
    a source node ID;
    a destination ID;
    a source MAC address; and
    a destination MAC address.

15. The interconnected processing system of claim 11, wherein the at least one SOC LAN ring comprises two communication rings supporting traffic in opposing directions.

16. The interconnected processing system of claim 15, wherein when a break occurs in one of the two communication rings, traffic is routed on a differing SOC LAN ring.

17. The interconnected processing system of claim 11, wherein at least some of the plurality of SOC integrated circuits reside on differing printed circuit boards.

18. In an interconnected processing system having a plurality of System On a Chip (SOC) integrated circuits, each having at least two Local Area Network (LAN) ports, a method for processing a data packet by a SOC integrated circuit comprising:
prepending a source node ID to the data packet, the source node ID corresponding to a source one of the plurality of SOC integrated circuits;
prepending a destination ID to the data packet, the destination node ID corresponding to a destination one of the plurality of SOC integrated circuits;
coupling the data packet onto a SOC Local Area Network (LAN) via a network interface of the SOC integrated circuit;
receiving a data packet from the SOC LAN via the network interface;
extracting a destination node ID of the data packet;
when the destination node ID of the data packet corresponds to a node ID of the SOC integrated circuit, routing the data packet internal to the SOC integrated circuit; and
when the destination node ID of the data packet does not correspond to the node ID of the SOC integrated circuit, routing the data packet to the SOC LAN via the network interface.

19. The method of claim 18, further comprising:
servicing a first SOC LAN ring of the SOC LAN; and
servicing a second SOC LAN ring of the SOC LAN, wherein data packets travel in one direction on the first SOC LAN ring and in a differing direction on the second SOC LAN ring.

20. The method of claim 18, further comprising:
receiving a data packet via the network interface via the first SOC LAN ring;
determining that a destination node ID of the data packet does not correspond to the node ID of the SOC integrated circuit;
during normal operations, routing the data packet to the first SOC LAN ring of the SOC LAN via the network interface; and
during abnormal operations, routing the data packet to a second SOC LAN ring of the SOC LAN via the network interface.

21. The method of claim 18, further comprising:
receiving a data packet via the network interface via the first SOC LAN ring;
determining that a destination node ID of the data packet does not correspond to the node ID of the SOC integrated circuit;
determining that the first SOC LAN ring is at least partially non-operative; and
routing the data packet to a second SOC LAN ring of the SOC LAN via the network interface.

22. The method of claim 21, further comprising setting a reverse routing indicator to indicate that routing of a data packet has been reversed.

23. The method of claim 18, further comprising removing the data packet from the SOC LAN ring when routing has failed.

* * * * *